(12) United States Patent
Hashimoto et al.

(10) Patent No.: US 8,068,704 B2
(45) Date of Patent: Nov. 29, 2011

(54) OPTICAL WAVEGUIDE CIRCUIT AND MULTI-CORE CENTRAL PROCESSING UNIT USING THE SAME

(75) Inventors: Rei Hashimoto, Tokyo (JP); Haruhiko Yoshida, Funabashi (JP); Mizunori Ezaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 129 days.

(21) Appl. No.: 12/393,633

(22) Filed: Feb. 26, 2009

(65) Prior Publication Data

US 2009/0245723 A1 Oct. 1, 2009

(30) Foreign Application Priority Data

Feb. 26, 2008 (JP) ................................. 2008-044952

(51) Int. Cl.
*G02B 6/12* (2006.01)
(52) U.S. Cl. ........................................... 385/14; 385/43
(58) Field of Classification Search .................. 385/43
See application file for complete search history.

(56) References Cited

U.S. PATENT DOCUMENTS 7,236,668 B2 * 6/2007 Hanashima et al. ............ 385/43

OTHER PUBLICATIONS

Toshihiko Baba, et al., "Si Photonic Wire Waveguides", Journal of the Institute of Electronics, Information and Communication Engineers, vol. J88-C, No. 6, 2005, pp. 363-373.
Wim Bogaerts, et al., "Low-loss, low-cross-talk crossings for silicon-on-insulator nanophotonic waveguides", Optical Letters, vol. 32, No. 19, Oct. 1, 2007, pp. 2801-2803.

* cited by examiner

*Primary Examiner* — Sung Pak
(74) *Attorney, Agent, or Firm* — Oblon, Spivak, McClelland, Maier & Neustadt, L.L.P.

(57) ABSTRACT

An optical waveguide circuit includes: a lower cladding layer formed on a substrate; a first optical waveguide formed on the lower cladding layer so as to partition the lower cladding layer into a first portion and a second portion; a second optical waveguide formed on the first portion, the second optical waveguide including a tip end portion directed toward a side face of the first optical waveguide, the tip end portion being narrowed in a tapered manner; and a third optical waveguide formed on the second portion, the third optical waveguide including a tip end portion directed toward the tip end portion of the second optical waveguide, a tip end portion of the third optical waveguide being narrowed in a tapered manner.

20 Claims, 4 Drawing Sheets

OPTICAL WAVEGUIDE CIRCUIT AND MULTI-CORE CENTRAL PROCESSING UNIT USING THE SAME

The entire disclosure of Japanese Patent Application No. 2008-044952 filed on Feb. 26, 2008, including specification, claims, drawings and abstract is incorporated herein by reference in its entirety.

BACKGROUND OF THE INVENTION

1. Field of the Invention

The present invention relates to an optical waveguide structure of an intersecting portion in a circuit structure having a portion where optical waveguides substantially intersect with each other.

2. Description of the Related Art

In accordance with development of researches on silicon photonics in which the mature process technique in a silicon LSI can be used, recently, it is possible to realize an optical waveguide which is very fine, and which produces a low loss even in a sharp bend. Therefore, miniaturization and low power consumption of a transmitting/receiving module and system for optical communication, and introduction and integration of optical interconnections into a silicon LSI are becoming enabled. A potential candidate of such an optical waveguide is a silicon (Si) thin line waveguide which can be formed on a silicon-on-insulator (SOI) substrate by a relatively simple technique.

In order to suppress the cost while satisfying increasing demands for a signal amount and a communication speed, it is important to improve the integration degree of an optical waveguide circuit. Therefore, waveguides are requested not only to be arranged in parallel, but also to intersect with each other. In an optical waveguide typified by an Si thin line waveguide, however, it is known that signal lights respectively propagating through two or more waveguides which intersect with each other are scattered and reflected, and interfere with each other in intersecting portions, thereby causing a high loss or crosstalk. It is difficult to design an optical waveguide circuit in which many intersecting portions must be formed.

In a conventional intersecting optical waveguide circuit, for example, two Si thin line waveguides intersect with each other, and signal lights propagate beyond the intersecting portion. At this time, scattering, reflection, interference, and crosstalk of lights occur in the intersecting portion, so that a loss of about 1.5 dB and crosstalk of −9.2 dB may occur in the propagation properties of one of the signals lights. Since the portion has a point-symmetric structure, such a high loss and crosstalk are naturally produced in the propagating signal lights in both the intersecting waveguides.

On the other hand, also a technique is known in which a waveguide in, for example, an intersecting portion is formed into an oval shape, thereby reducing the levels of a loss and crosstalk (for example, see Non-patent Reference 1). In this structure, light scattering in the intersecting portion is suppressed, and excellent propagation in which a loss of about 0.1 dB and crosstalk of about −25 dB or less occur in a signal light propagating in the waveguide having an oval shape is enabled.

In this structure, however, the propagation property of the optical waveguide which is not formed into an oval shape is impaired as compared with the conventional structure, with the result that the loss and crosstalk are high. Moreover, the Non-patent Reference describes that, when it is attempted that the oval structure is applied to both of two intersecting waveguides to reduce the losses of signal lights in the waveguides, the loss is 1.2 dB or at the level in the vicinity of 1.5 dB which is attained in the case where no countermeasure is taken.

In the structure, namely, the propagation property of only one of the intersecting optical waveguides can be improved, but it is considered that the propagation properties of both of the two intersecting optical waveguides are hardly improved. High-density integration of optical interconnections which require many intersecting portions is hardly realized by intersecting optical waveguides having such a property.

In a portion where optical waveguides intersect with each other, it is difficult that, not only a signal light propagating in one of the waveguides, but also all signal lights propagating in the waveguides are enabled to propagate at a low loss and low crosstalk. When all signal lights propagating in the waveguides cannot propagate at a low loss and low crosstalk, intersecting portions are hardly included in the circuit design, so that the degree of freedom in the circuit design is lowered and high-density integration of optical interconnections is impeded.

SUMMARY OF THE INVENTION

The invention provides an optical waveguide circuit including: a lower cladding layer formed on a substrate; a first optical waveguide formed on the lower cladding layer so as to partition the lower cladding layer into a first portion and a second portion; a second optical waveguide formed on the first portion, the second optical waveguide including a tip end portion directed toward a side face of the first optical waveguide, the tip end portion being narrowed in a tapered manner; and a third optical waveguide formed on the second portion, the third optical waveguide including a tip end portion directed toward the tip end portion of the second optical waveguide, a tip end portion of the third optical waveguide being narrowed in a tapered manner.

BRIEF DESCRIPTION OF THE DRAWINGS

Embodiment may be described in detail with reference to the accompanying drawings, in which.

DETAILED DESCRIPTION OF THE INVENTION

Hereinafter, the invention will be described in detail with reference to the drawings.

First, the waveguide principle of an optical waveguide in the invention will be described with reference to the figures.

Figure 1:
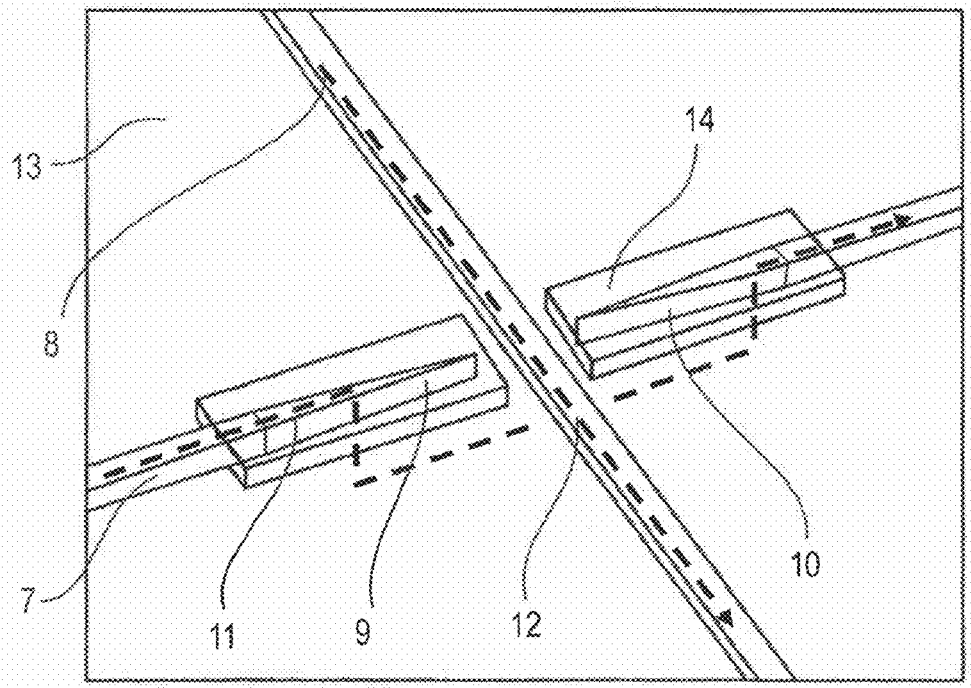
FIG. 1 is a diagram illustrating an intersecting optical waveguide structure in the invention.

In the invention, as shown in FIG. 1, a lower cladding layer 13 is formed on a substrate (not shown), and optical waveguides 7, 8 are formed in a part on the lower cladding layer 13. The optical waveguides 7, 8 form an intersecting portion where the waveguides intersect with each other, but are not directly contacted with each other because the optical waveguide 7 is interrupted in the intersecting portion. The tip ends of the optical waveguide 7 in the interrupted portion are configured as tapered structures 9, 10 which are narrowed toward the intersecting portion, respectively. Upper cladding layers 14 which are higher in refractive index than the lower cladding layer 13 are formed above the tapered structures 9, 10, respectively. According to the invention, the employment of the thus configured intersecting waveguide structure causes a signal light 11 propagating in the optical waveguide 7 to be disabled to propagate in the optical waveguide 7 having a higher refractive index, because the light confining function is gradually weakened in the tapered structure 9, with the result that the signal light is partially coupled to the lower cladding layer 13 having a lower refractive index. Thereafter, the signal light 11 propagates in the lower cladding layer 13, but is guided so as to propagate in parallel to the optical waveguide 7 without being diffused, because the upper cladding layer 14 which is higher in refractive index than the lower cladding layer 13 are formed thereabove along the direction in which the light is to propagate. After the signal light 11 propagating in the lower cladding layer 13 passes over the intersecting portion, in the tapered structure 10 where the light confining effect is gradually increased, the signal light is partially coupled to the waveguide 7 which is a core layer having a higher refractive index. In this way, the signal light 11 can again propagate in the optical waveguide 7 beyond the waveguide intersecting portion without being directly contacted with the optical waveguide 8.

Because a signal light is once transferred to another layer as described above, the invention succeeds to prevent a state where signal lights of two kinds directly overlap to interfere with each other, from occurring in an intersecting portion. Therefore, the optical waveguide 8 can have a structure which is strictly identical with a usual linear waveguide structure, even in the intersecting portion, with the result that a signal light 12 propagating in the waveguide 8 produces substantially no loss and crosstalk in the intersecting portion.

On the other hand, with respect to the signal light 11 propagating in the interrupted optical waveguide 7, the loss due to scattering and reflection of the signal light in the intersecting portion can be largely reduced, and also crosstalk due to interference and crossing of signal lights can be drastically reduced. At this time, however, a loss due to the interlayer movement of the signal light 11 in the intersecting portion is produced as a new kind of loss which is not produced in a conventional technique. The loss due to the interlayer movement for passing over the intersecting portion is about 1.5 to 2 dB, and substantially equal to the value in the conventional art or 1.5 dB. When the propagation property of the intersecting portion with respect to the signal light 11 in the optical waveguide 7 is compared with that of the conventional art, a loss which is substantially equal to the conventional art is produced, and crosstalk can be reduced to substantially zero.

In the intersecting optical waveguide structure of the invention, as described above, the loss and crosstalk of one of the signal lights can be reduced to substantially zero, and also the other signal light can propagate while causing crosstalk of substantially zero. Therefore, the invention can provide a structure which is very superior to the conventional structure.

Hereinafter, the invention will be described in detail by means of exemplifying specific embodiments with reference to the figures.

First Embodiment

Figure 2:
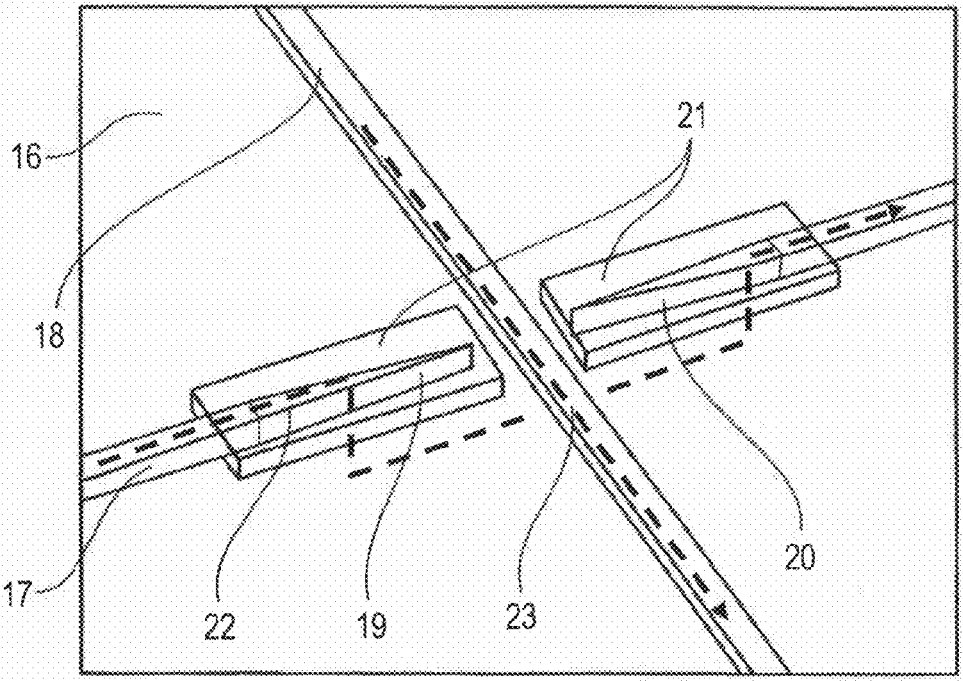
FIG. 2 is a perspective view showing an intersecting optical waveguide structure in a first embodiment.
Figure 3:
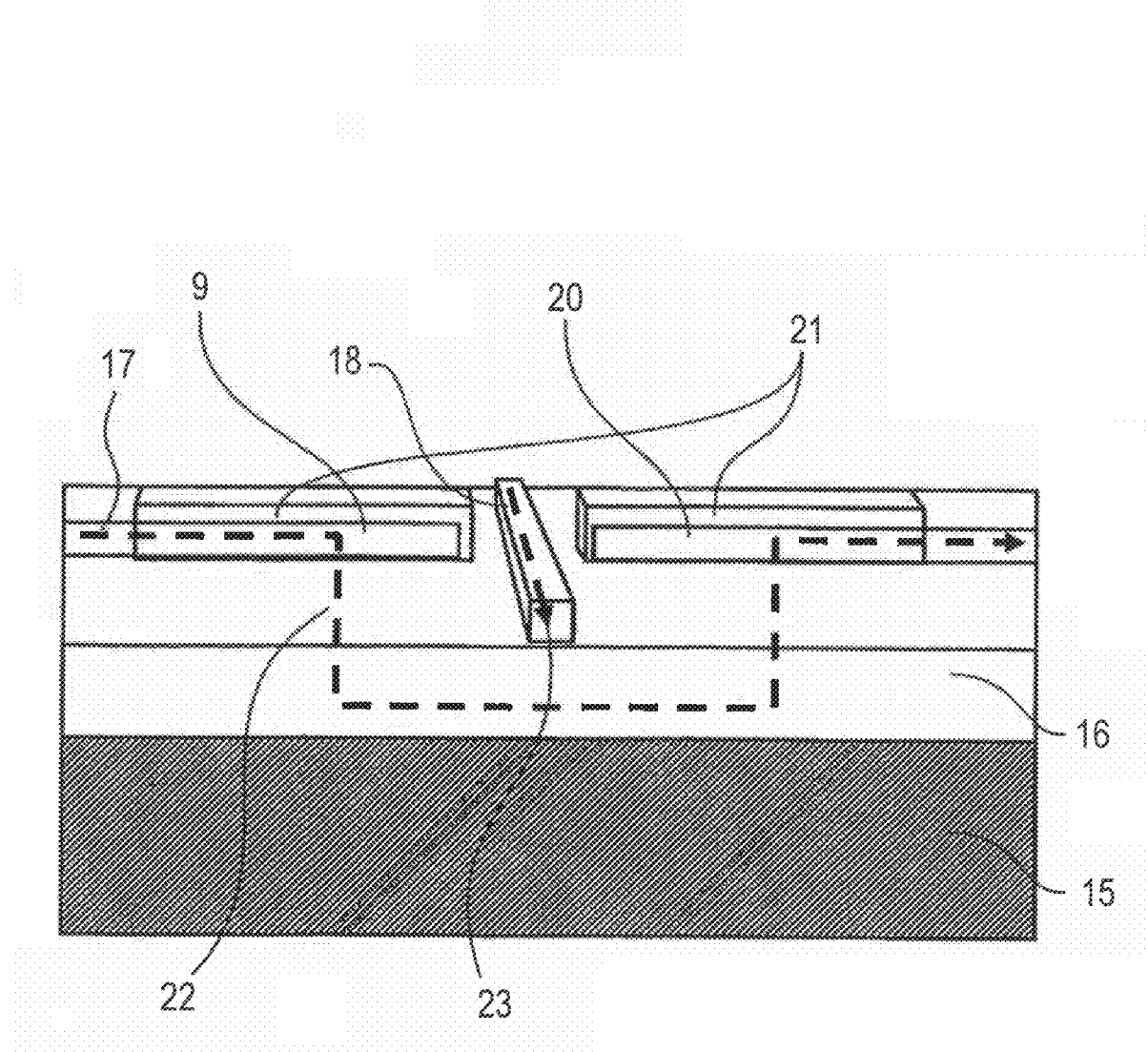
FIG. 3 is a sectional view showing the intersecting optical waveguide structure in the first embodiment.

FIG. 2 is a perspective view schematically illustrating an intersecting optical waveguide structure in a first embodiment of the invention, and FIG. 3 is a sectional view of the structure.

A lower cladding layer 16 configured by an $SiO_2$ film is formed on an Si substrate 15, and optical waveguides 17, 18 made of Si are formed in a part on the lower cladding layer 13. Signal lights 22, 23 propagate in the waveguides, respectively. The thickness of the lower cladding layer 16 is 3 μm, and the optical waveguides 17, 18 have a thickness of 250 nm and a width of 450 nm. The optical waveguides 17, 18 form an intersecting portion where they intersect with each other, but are not directly contacted with each other because the optical waveguide 17 is interrupted in the intersecting portion. The tip ends of the optical waveguide 17 in the interrupted portions are configured as tapered structures 19, which are narrowed toward the intersecting portion, respectively. The tapered structures 19, 20 have a length of 200 μm, and the narrowed and tapered tip end portions have a width of 80 nm. The tip end portions of the tapered structures 19, 20 are placed while forming a gap of 50 μm from the respective sidewalls of the optical waveguide 18. In FIG. 2, for the sake of easy understanding, it is exemplarily shown that the intersection angle of the optical waveguides 17, 18 is 90 deg. However, the angles are not necessary to be 90 deg. In the intersecting optical waveguide structure of the invention, reflection and crosstalk of signal lights in the intersecting portion, which are observed in the conventional structure, do not occur. Therefore, increase and decrease of the loss and crosstalk depending on the difference of the intersection angle are not produced, and the intersection angle can be freely designed. When the intersection angle is excessively steep and the optical waveguides intersect with each other also in a portion other than the intersecting portion, however, an unwanted loss and crosstalk may be caused. From the above, preferably, the intersection angle of the optical waveguides 17, 18 is 5 to 90 deg. Upper cladding layers 21 which are higher in refractive index than the lower cladding layer 16 are formed above the tapered structures 19, 20. Preferably, the refractive index and thickness of the upper cladding layers have the following relationship:

$$d_2 \leq d_1 \leq \lambda/n_1 \qquad (1)$$

where $n_1$ is the refractive index of the upper cladding layers, $d_1$ is the thickness of the upper cladding layers, $d_2$ is the thickness of the optical waveguides, and $\lambda$ is the wavelength of incident light. At this time, the light does not propagate in the upper cladding layers, and is coupled to the optical waveguide. In the embodiment, polyimide having a refractive index of 1.53 is used as a material. In the upper cladding layers 21, the thickness is 600 nm, the width is 3 μm, and the length is set to 300 μm in order to include the tapered structure portion. In a manner similar to the optical waveguides, tip end portions of the upper cladding layers 21 on the side of the intersecting portion may have a tapered structure (not shown). FIG. 2 shows only the intersecting portion of the optical waveguides. Light emitting and receiving devices, other various devices, wirings, and the like are formed in other portions to which the waveguides are connected.

This structure can be realized by using a silicon-on-insulator (SOI) substrate. Namely, the lower cladding layer 16 is an embedded insulating film ($SiO_2$ film) in the SOI substrate, and the optical waveguides 17, 18 are formed by processing the Si layer of the SOI substrate into the form of thin lines.

As described above, the employment of the thus configured intersecting optical waveguide structure enables the optical waveguide 18 to have a structure which is substantially identical with a linear waveguide structure, also in the intersecting portion, and hence a loss and crosstalk in the intersecting portion are hardly produced in the signal light 21 propagating in the optical waveguide 18, and can be reduced to substantially zero.

By contrast, because the light confining function in the optical waveguide 17 which has a higher refractive index is weakened through the tapered structure, the signal light 22 propagating in the optical waveguide 17 is once transferred with distributed coupling into the lower cladding layer 16, and propagates in the lower cladding layer 16 to pass over the intersecting portion. Preferably, the thickness do of the lower cladding layer has a following relationship:

$$d_0 \geq \lambda/n_0 \qquad (2)$$

where $\lambda$ is the wavelength of the light propagating in the optical waveguide 17, and $n_0$ is the refractive index of the lower cladding layer 16.

As described above, the upper cladding layers 21 which are higher in refractive index than the lower cladding layer are formed above the optical waveguide 17 and in parallel to the optical waveguide 17. Therefore, the traveling direction of the signal light 22 propagating in the lower cladding layer is guided to a direction parallel to the optical waveguide 17. The refractive index of the upper cladding layers 21 must be increased to a degree where the light incident on the lower cladding layer 16 is attracted sufficiently strongly to the upper cladding layer 21. In the embodiment, the tip ends of the tapered portions of the interrupted optical waveguide 17 are placed while being separated by a distance of 50 μm from the other intersecting waveguide 18. The distance may be 30 to 200 μm. When the distance is shorter than 30 μm, the signal light 22 reaches the other intersecting waveguide 18 before the distribution coupling (evanescent coupling) of the signal light 22 with the lower cladding layer is completed, and the propagation loss is increased. When the distance is longer than 200 μm, the length by which the signal light 22 is propagated in the lower cladding layer 16 is prolonged, and the component which is scattered in the lower cladding layer 16 is increased so as to make the loss large. When the distance is 50 μm, the loss is minimum. Therefore, this value is preferable.

In the case where tip end portions of the upper cladding layers 21 on the side of the intersecting portion have a tapered structure, it is possible to suppress the propagation loss due to diffusion of the signal light 22 into the lower cladding layer, and scattering in the intersecting portion. At this time, preferably, the length of the tapered portions of the upper cladding layers is about 20 μm because, when the length of the tapered portions is excessively long, the light confining effect for the signal light propagating in the waveguide becomes so weak that the propagation efficiency is lowered. The signal light 22 which passes over the intersecting portion is recoupled to the optical waveguide 17 through the tapered portion. At this time, when the traveling direction of the signal is set to the z direction, the tip end portions of the tapered structures 19, 20 which are interrupted in FIG. 2 are positioned on the coaxis of the z axis. Actually, however, the signal light propagates in the lower cladding layer, and hence the tip end portions are not required to be strictly placed in front of each other. Even when the deviation from the front is about 300 μm, the loss and the like are not increased. The deviation which is larger than this value is not preferable because the loss is increased. Similarly, the refractive index of the upper cladding layers 21 is increased to a degree where the signal light 22 propagating in the lower cladding layer 16 is attracted sufficiently strongly to the tapered portions of the upper cladding layer 21 and the optical waveguide 17. In this case, the portion of the upper cladding layer 21 does not confine the light, but plays roles of attracting the signal light 22 propagating in the lower cladding layer 16 toward the upper cladding layer 21, and assisting mode matching of coupled light in the tapered structure portion.

Figure 4:
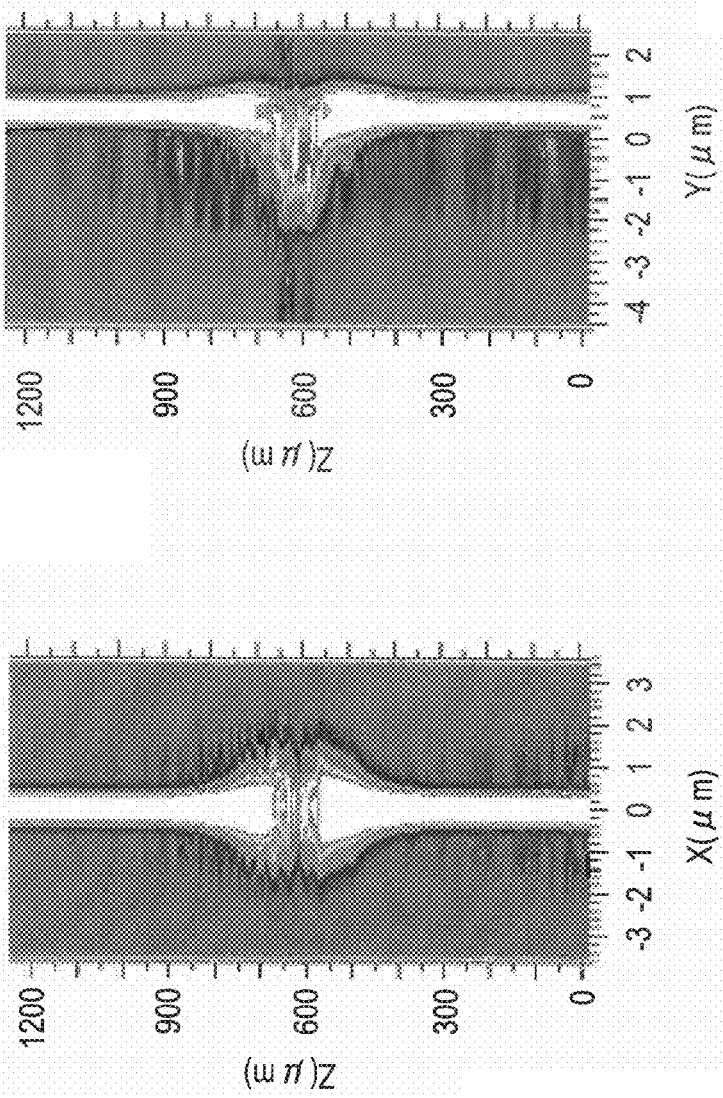
FIGS. 4A-4C are views showing the manner of light propagation in the intersecting optical waveguide in the first embodiment.

FIGS. 4A-4C show the manner of propagation of the signal light 22 in the intersecting optical waveguide structure. FIG. 4A is a view showing the light distribution with respect to the thickness direction (Y direction) when the optical coupling device in the embodiment is viewed from the side face, and also the optical coupling efficiency in the light traveling direction (Z direction). FIG. 4B is a view showing the light distribution with respect to the width direction (X direction) when the optical coupling device is viewed from the upper face, and FIG. 4C shows the optical coupling efficiency in the light traveling direction (Z direction). As a portion in the figures is whiter, the light intensity in the portion is higher. These figures clearly show that the signal light 22 propagating in the optical waveguide 17 is once transferred into the lower cladding layer 16 in immediately front of the intersecting portion, then propagates in the lower cladding layer 16 while being guided in parallel to the optical waveguide 17 by the upper cladding layer 21, and, after passing over the intersecting portion, returns to the waveguide 17. The loss in the intersecting portion is about 2 dB, and substantially equal to the value in the conventional art. It seems that most of the loss therein is occupied by the component which is diffused into the lower cladding layer 16, and that which is scattered in the intersecting portion.

At this time, trench regions (not shown) may be formed by digging the lower cladding layer 16 in the form parallel to the both sides of the interrupted optical waveguide 17, whereby the diffusion of the signal light 22 in the lower cladding layer 16 is suppressed to reduce the loss. In this case, the trench regions are located outside of the width of the upper cladding layers 21. In the embodiment, the width of the upper cladding layers 21 is 3 μm, and hence the trench regions are separated from by 1.5 μm or more from the tapered portions of the interrupted waveguide 17. However, as the trench regions are further separated, the effect of suppressing the diffusion is smaller. Therefore, the trench regions are preferably separated by 1.5 to 2.5 μm, and a more preferable case is that the trench regions are separated by 1.5 μm. In this case, the propagation loss of the signal light 22 in the intersecting portion can be reduced to about 1.5 dB.

At this time, the crosstalk of the signal light 22 in the intersecting portion is −60 dB or less, or substantially zero.

As described above, in the intersecting optical waveguide structure in the invention, the loss and crosstalk of the signal light propagating in one of the waveguides can be reduced to substantially zero, and also the crosstalk of the signal light propagating in the other interrupted waveguide can be reduced to substantially zero.

Second Embodiment

Figure 5:
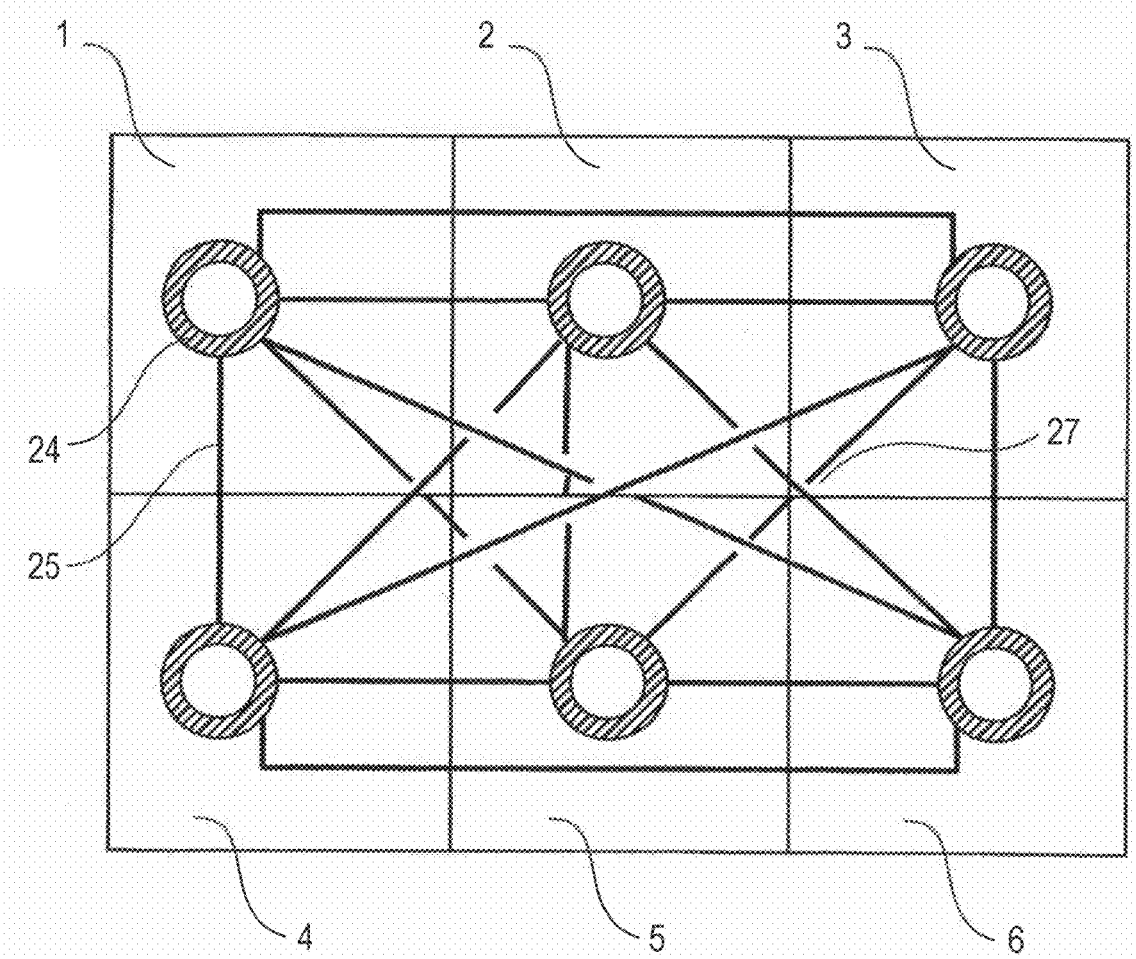
FIG. 5 is a diagram schematically showing the configuration of an optical waveguide circuit in a second embodiment.

An embodiment of an optical waveguide circuit to which the optical-waveguide intersecting portion in the invention is applied will be described. FIG. 5 is a diagram of a multi-core central processing unit in which six arithmetic cores are interconnected through an optical waveguide circuit. In the figure, components which are not related to the invention, such as signal transmitting/receiving ports with the outside, and electrodes are omitted. An arithmetic element of such a multi-core structure in which communications among cores are performed through electric wirings has been put to practical use.

A multi-core chip is formed by using an SOI substrate, an $SiO_2$ layer is used as a lower cladding layer, and an Si thin line waveguide is formed by processing an upper Si layer, thereby configuring an optical waveguide. Optical signal transmitting/receiving ports 24 on arithmetic cores 1 to 6 are connected to the all other optical signal transmitting/receiving ports through optical waveguides 25, so that communication among all the multi-cores is enabled. In the embodiment, at this time, nine optical-waveguide intersecting portions 27 are formed. When attention is focused on the optical waveguide from the arithmetic core 1 to the arithmetic core 6, and that from the arithmetic core 3 to the arithmetic core 4, four optical-waveguide intersecting portions are formed in each of the waveguides. In the case of the conventional art, as described above, a loss of 1.5 dB and crosstalk of −9.2 dB occur in each of two signals lights in the optical-waveguide intersecting portions. Therefore, a very high loss and crosstalk are produced in signal lights which propagate from the core 1 to core 6, and from the core 3 to the core 4, and which pass through four intersecting portions, with the result that correct communication is hardly performed. Therefore, a multi-core chip using optical interconnections to which the conventional structure is applied has not been put to practical use. By contrast, in the case where the intersection structure in the invention is applied to the optical-waveguide intersecting portions, as shown in the figure, the crosstalk can be lowered to −60 dB or less, and the whole loss can be suppressed to one half or less of that of the conventional structure.

The invention is not restricted to the above-described embodiments. Although an SOI substrate is used in the embodiments, it is not always necessary to use an SOI substrate as far as an optical waveguide is formed in a part on a lower cladding layer and upper cladding layers are disposed thereon. Furthermore, the materials of the upper cladding layers, the lower cladding layer, and the optical waveguide are not restricted to those of the embodiments, but can be suitably changed in accordance with the specification as far as the following relationship is satisfied:

$$n_2 < n_1 < n_0 \quad (3)$$

where $n_1$ is the refractive index of the upper cladding layers, $n_2$ is the refractive index of the lower cladding layer, and no is the refractive index of the optical waveguides.

Moreover, the conditions such as the length, thickness, and width of the upper cladding layers, the thickness of the lower cladding layer, the thickness and width of the optical waveguides, the length and thickness of the tapered structure portions, the width of the tip end portions, and the intersection angle of the waveguides can be suitably changed in accordance with the specification, and variously modified without departing the spirit of the invention.

What is claimed is:

1. An optical waveguide circuit comprising:
a lower cladding layer formed on a substrate;
a first optical waveguide formed on the lower cladding layer so as to partition the lower cladding layer into a first portion and a second portion;
a second optical waveguide formed on the first portion, the second optical waveguide including a tip end portion formed in a tapered shape; and
a third optical waveguide formed on the second portion, the third optical waveguide including a tip end portion opposed to the tip end portion of the second optical waveguide via the first optical waveguide, a tip end portion of the third optical waveguide being formed in a tapered shape,
wherein the first optical waveguide is disposed between the second optical waveguide and the third optical waveguide with a gap interposed between the first optical waveguide and the respective second and third optical waveguides, and
wherein the tip end portion of the second optical waveguide is opposed to a first side face of the first optical waveguide, and the tip end portion of the third optical waveguide is opposed to a second side face of the first optical waveguide opposite to the first side face.

2. The optical waveguide circuit of claim 1, further comprising:
a first upper cladding layer formed on the lower cladding layer and the tip end portion of the second optical waveguide, the first upper cladding layer configured to have a refractive index higher than the lower cladding layer; and
a second upper cladding layer formed on the lower cladding layer and the tip end portion of the third optical waveguide, the second upper cladding layer configured to have a refractive index higher than said lower cladding layer.

3. The optical waveguide circuit of claim 2, wherein a thickness $d_0$ of the lower cladding layer has a following relationship:

$$d_0 \geq \lambda/n_0$$

where $\lambda$ is a wavelength of light guided in said first to third optical waveguides, and $n_0$ is the refractive index of the lower cladding layer.

4. The optical waveguide circuit of claim 2, wherein a thickness $d_1$ of at least one of the first and second upper cladding layers has a following relationship:

$$d_2 \leq d_1 \leq \lambda/n_1$$

where $d_2$ is a thickness of at least one of the first to third optical waveguides, and $n_1$ is the refractive index of at least one of the first and second upper cladding layers.

5. The optical waveguide circuit of claim 2, wherein at least one of the tip ends of the second and third optical waveguide is at a distance of 30 to 200 μm from the side face of the first optical waveguide.

6. The optical waveguide circuit of claim 2,
wherein at least one of the first upper cladding layer and the second upper cladding layer includes a tip end having a tapered portion that is narrowed in a tapered manner, the tip end being opposed to a side face of the first optical waveguide; and
a length of the tapered portion is shorter than 100 μm.

7. The optical waveguide circuit of claim 6, further comprising: trench regions formed by removing parts of the lower cladding layer which are on both sides of the first or second upper cladding layer.

8. The optical waveguide circuit of claim 1,
wherein the substrate includes a silicon-on-insulator substrate.

9. The optical waveguide circuit of claim 8,
wherein the first to third optical waveguides comprise silicon; and
the lower cladding layer comprises silicon oxide.

10. A multi-core central processing unit, comprising:
a substrate;
a lower cladding layer formed on the substrate;
a first optical waveguide formed on the lower cladding layer so as to partition the lower cladding layer into a first portion and a second portion;
a second optical waveguide formed on the first portion, the second optical waveguide including a tip end portion formed in a tapered shape; and
a third optical waveguide formed on the second portion, the third optical waveguide including a tip end portion opposed to the tip end portion of the second optical waveguide, a tip end portion of the third optical waveguide being formed in a tapered shape, wherein the first optical waveguide is disposed between the second optical waveguide and the third optical waveguide with a gap interposed between the first optical waveguide and the respective second and third optical waveguides, and wherein the tip end portion of the second optical waveguide is opposed to a first side face of the first optical waveguide, and the tip end portion of the third optical waveguide is opposed to a second side face of the first optical waveguide opposite to the first side face.

11. The multi-core central processing unit claim 10, further comprising:

a first upper cladding layer formed on the lower cladding layer and the tip end portion of the second optical waveguide, the first upper cladding layer configured to have a refractive index higher than the lower cladding layer; and a second upper cladding layer formed on the lower cladding layer and the tip end portion of the third optical waveguide, the second upper cladding layer configured to have a refractive index higher than said lower cladding layer.

12. The multi-core central processing unit of claim 11, wherein a thickness $d_0$ of the lower cladding layer has a following relationship:

$$d_0 \geq \lambda/n_0$$

where $\lambda$, is a wavelength of light guided in said first to third optical waveguides, and $n_0$ is the refractive index of the lower cladding layer.

13. The multi-core central processing unit of claim 11, wherein a thickness $d_1$ of at least one of the first and second upper cladding layers has a following relationship:

$$d_2 \leq d_1 \leq \lambda/n_1$$

where $d_2$ is a thickness of at least one of the first to third optical waveguides, and $n_1$ is the refractive index of at least one of the first and second upper cladding layers.

14. The multi-core central processing unit of claim 11, wherein at least one of the tip ends of the second and third optical waveguide is at a distance of 30 to 200 μm from the side face of the first optical waveguide.

15. The multi-core central processing unit of claim 11, wherein at least one of the first upper cladding layer and the second upper cladding layer includes a tip end having a tapered portion that is narrowed in a tapered manner, the tip end being opposed to a side face of the first optical waveguide; and a length of the tapered portion is shorter than 100 μm.

16. The multi-core central processing unit of claim 15, further comprising: trench regions formed by removing parts of the lower cladding layer which are on both sides of the first or second upper cladding layer.

17. The multi-core central processing unit of claim 10, wherein the substrate includes a silicon-on-insulator substrate.

18. The multi-core central processing unit of claim 17, wherein the first to third optical waveguides comprise silicon; and the lower cladding layer comprises silicon oxide.

19. The waveguide circuit of claim 1, wherein light output from the second optical waveguide enters the third optical waveguide without substantially affecting light travelling in the first optical waveguide.

20. The waveguide circuit of claim 1, wherein a travelling direction of light travelling in the second and third optical waveguides is substantially orthogonal to a travelling direction of light travelling in the first optical waveguide.

* * * * *